(12) United States Patent
Sato et al.

(10) Patent No.: US 10,442,467 B2
(45) Date of Patent: Oct. 15, 2019

(54) CENTRAL PART STRUCTURE FOR VEHICLE

(71) Applicant: TOYOTA JIDOSHA KABUSHIKI KAISHA, Toyota-shi, Aichi-ken (JP)

(72) Inventors: Kazuyuki Sato, Chiryu (JP); Hiroshi Hashiguchi, Takahama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 14 days.

(21) Appl. No.: 15/806,637

(22) Filed: Nov. 8, 2017

(65) Prior Publication Data
US 2018/0148102 A1 May 31, 2018

(30) Foreign Application Priority Data
Nov. 28, 2016 (JP) ................... 2016-229827

(51) Int. Cl.
| B62D 21/15 | (2006.01) |
| B62D 25/04 | (2006.01) |
| B62D 25/06 | (2006.01) |
| B62D 27/02 | (2006.01) |
| B62D 29/00 | (2006.01) |

(52) U.S. Cl.
CPC ........... B62D 21/157 (2013.01); B62D 25/04 (2013.01); B62D 25/06 (2013.01); B62D 27/023 (2013.01); B62D 29/007 (2013.01)

(58) Field of Classification Search
CPC ...... B62D 25/04; B62D 25/06; B62D 21/157; B62D 27/023
See application file for complete search history.

(56) References Cited

U.S. PATENT DOCUMENTS

| 7,407,222 | B2 | 8/2008 | Anderson et al. | |
| 2012/0126582 | A1* | 5/2012 | Kishi | B62D 25/04 |
| | | | | 296/203.01 |
| 2012/0153676 | A1* | 6/2012 | Shono | B62D 25/04 |
| | | | | 296/193.06 |
| 2013/0300155 | A1 | 11/2013 | Kurokawa | |
| 2014/0028057 | A1* | 1/2014 | Nishimura | B62D 25/04 |
| | | | | 296/193.06 |
| 2014/0054927 | A1* | 2/2014 | Nakamura | B62D 25/04 |
| | | | | 296/193.06 |
| 2014/0354012 | A1* | 12/2014 | Nagai | B62D 27/023 |
| | | | | 296/193.06 |
| 2016/0083018 | A1* | 3/2016 | Anegawa | B62D 25/04 |
| | | | | 296/193.05 |

(Continued)

FOREIGN PATENT DOCUMENTS

| JP | 2007-313963 A | 12/2007 |
| WO | 2012/101783 A1 | 8/2012 |

*Primary Examiner* — Gregory A Blankenship
(74) *Attorney, Agent, or Firm* — Oliff PLC (57) ABSTRACT

A central part structure for a vehicle includes: a roof side rail formed in a tubular shape; and a first reinforcing member accommodated in the roof side rail at a position where a roof reinforcement and the roof side rail overlap with each other, wherein the first reinforcing member includes a main reinforcement wall portion extending along the roof side rail, and a traverse portion provided so as to cross the roof side rail, the traverse portion being placed at a position where the traverse portion can receive a side collision load applied via an upper part of a center pillar.

8 Claims, 5 Drawing Sheets

(56) References Cited

U.S. PATENT DOCUMENTS

| | | | |
|---|---|---|---|
| 2016/0107698 A1* | 4/2016 | Oshima | B62D 21/157 296/187.12 |
| 2016/0107701 A1* | 4/2016 | Anegawa | B62D 27/023 296/193.06 |
| 2016/0288841 A1* | 10/2016 | Nakanishi | B62D 25/04 |
| 2016/0332674 A1* | 11/2016 | Okuyama | B62D 25/04 |
| 2017/0305470 A1* | 10/2017 | Sato | B62D 25/02 |
| 2018/0148102 A1* | 5/2018 | Sato | B62D 21/157 |

* cited by examiner

CENTRAL PART STRUCTURE FOR VEHICLE

INCORPORATION BY REFERENCE

The disclosure of Japanese Patent Application No. 2016-229827 filed on Nov. 28, 2016 including the specification, drawings and abstract is incorporated herein by reference in its entirety.

BACKGROUND

1. Field

The disclosure relates to a central part structure for a vehicle.

2. Description of Related Art

In recent years, a strength of a center pillar has been raised in general for countermeasures for side impact of a vehicle. However, when the strength of the center pillar improves, a larger collision load is input into a beam portion (a roof side rail, a rocker panel) of a vehicle body for supporting an upper part and a lower part of the center pillar. On this account, in a technique described in Japanese Patent Application Publication 2007-313963 (JP 2007-313963 A), a reinforcing member 103 is provided in a roof side rail 102 to which an upper part of a center pillar is connected, as illustrated in a drawing of longitudinal section of FIG. 7, so as to achieve improvement in strength of the roof side rail 102.

SUMMARY

Figure 7:
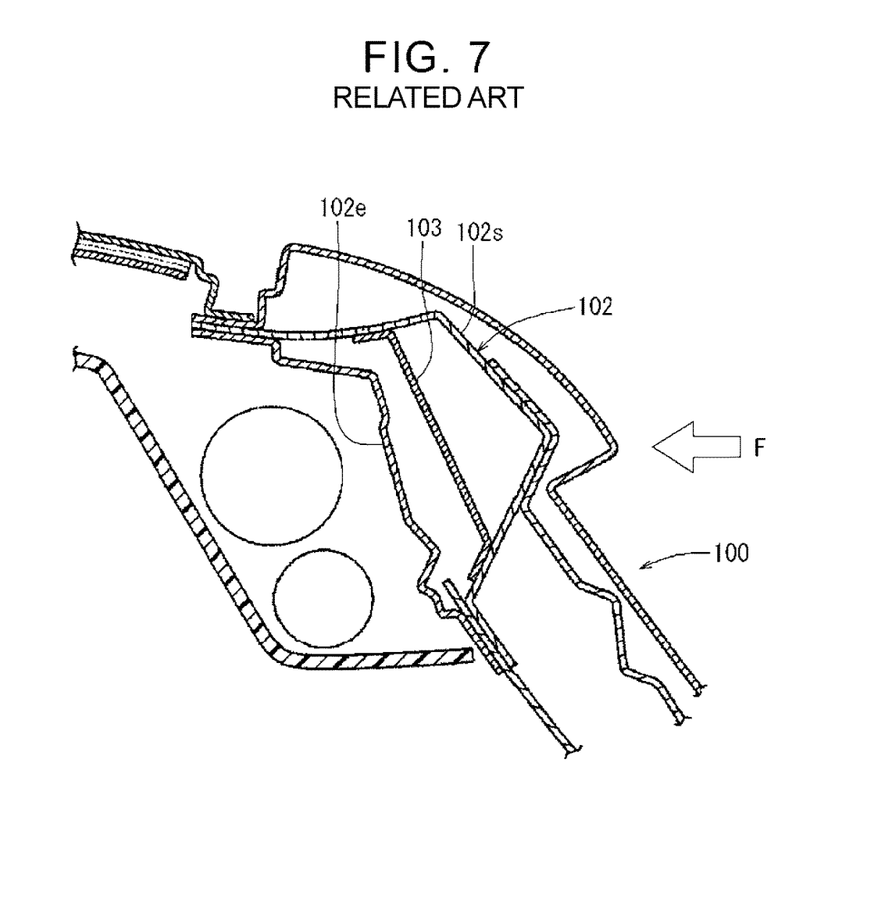
FIG. 7 is a drawing of a longitudinal section of a roof side rail and an upper part of a center pillar in a related art.

In the related art, the roof side rail 102 is constituted by a rail outer panel 102s and a rail inner panel 102e, and has a tubular shape. Further, the reinforcing member 103 is provided so as to partition off an internal space of the roof side rail 102 into right and left sides. That is, the reinforcing member 103 is provided in a direction to extend along the roof side rail 102. Because of this, a reinforcement effect of the reinforcing member 103 with respect to crushing of the roof side rail 102 is not so large. Accordingly, when a collision load F is applied to the roof side rail 102 from the upper part of the center pillar, the roof side rail 102 is crushed to deform, so that an entry amount of the roof side rail 102 into a vehicle cabin might increase.

This disclosure provides a central part structure for a vehicle, which restrains deformation of a roof side rail toward an inner side of a vehicle cabin when a collision load due to a vehicle side collision is applied to the roof side rail via a center pillar.

A central part structure for a vehicle according to a first aspect of the disclosure includes: roof side rail provided so as to extend in a vehicle front-rear direction, the roof side rail being formed in a tubular shape, a roof reinforcement extending in a vehicle width direction so as to be connected to the roof side rail, a center pillar configured to support the roof side rail; and a first reinforcing member accommodated in the roof side rail at a position where the roof side rail and the roof reinforcement overlap with each other, wherein the first reinforcing member includes a main reinforcement wall portion extending along the roof side rail and a traverse portion provided so as to cross the roof side rail, the traverse portion being placed at a position where the traverse portion receives a side collision load applied via an upper part of the center pillar.

In the above aspect, the first reinforcing member is accommodated in the roof side rail at a position where the roof side rail and the roof reinforcement overlap with each other. The traverse portion of the first reinforcing member is placed at a position where the traverse portion can receive a collision load applied via the center pillar. That is, since the traverse portion of the first reinforcing member receives the collision load applied via the center pillar, the roof side rail is hardly crushed. On this account, the collision load applied via the center pillar is transmitted from the traverse portion of the first reinforcing member to the roof reinforcement extending in a right-left direction (the vehicle width direction). That is, since the center pillar, the roof side rail, and the roof reinforcement receive the collision load effectively, it is possible to restrain the roof side rail from deforming toward an inner side of a vehicle cabin.

In the above aspect, the roof reinforcement connected to the roof side rail may include at least one vertical wall portion extending in the vehicle width direction, and the traverse portion of the first reinforcing member may be placed at a position on an extension line of the vertical wall portion of the roof reinforcement. Hereby, transfer efficiency of the collision load between the roof side rail (the first reinforcing member) and the roof reinforcement improves.

In the above aspect, the traverse portion may be provided on each end of the main reinforcement wall portion in the vehicle front-rear direction. A linear dimension of the first reinforcing member in the vehicle front-rear direction may be substantially equal to a width dimension of the roof reinforcement in the vehicle front-rear direction.

In the above aspect, the first reinforcing member may be connected to the upper part of the center pillar. Hereby, transfer efficiency of the collision load from the upper part of the center pillar to the traverse portion increases.

In the above aspect, a roof opening may be formed in an area surrounded by the roof side rail and a front surface of the roof reinforcement, and the upper part of the center pillar may be connected to the roof side rail at a position on a front side relative to a center of the roof reinforcement in the vehicle front-rear direction.

In the above aspect, a second reinforcing member may be provided inside the roof side rail at a position where the upper part of the center pillar and the roof side rail overlap with each other, so as to reinforce the roof side rail, and a rear end of the second reinforcing member may be connected to a front end of the first reinforcing member and the upper part of the center pillar.

In the above aspect, the traverse portion may be a separator configured to partition a space inside the roof side rail.

In the above aspect, the roof reinforcement may include a plurality of vertical wall portions extending in the vehicle width direction.

According to this disclosure, it is possible to restrain deformation of the roof side rail toward the inner side of the vehicle cabin when a collision load due to a vehicle side collision is applied to the roof side rail via the center pillar.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

[Embodiment 1]

The following describes a central part structure for a vehicle according to Embodiment 1 of the disclosure with reference to FIGS. 1 to 6. Here, front, rear, left, right, up, and down in the drawings correspond to front, rear, left, right, up, and down of the vehicle.

<Summary of Body 10 of Vehicle>

Figure 1:
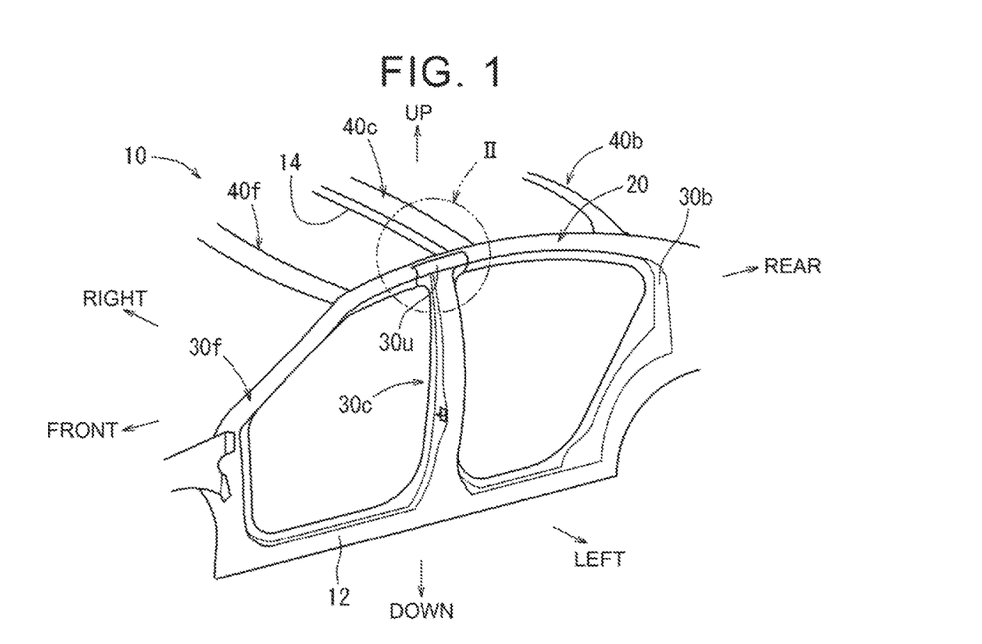
FIG. 1 is a perspective view of a vehicle body having a central part structure according to Embodiment 1 of this disclosure, when viewed from a left front side.

As illustrated in FIG. 1, a body 10 (hereinafter referred to as a vehicle body 10) of the vehicle according to the present embodiment is a body of a sedan-type passenger car. Note that FIG. 1 is a perspective view of the vehicle body 10 viewed from a left front side, and a right part thereof is omitted. Respective tubular rockers 12 extending in a vehicle front-rear direction are provided on both right and left sides of a vehicle cabin floor in the vehicle body 10. A front pillar 30f, a center pillar 30c, and a rear pillar 30b are provided in a standing manner in a front end, a central part, and a rear end of the rocker 12 of the vehicle body 10, respectively. Further, respective roof side rails 20 extending in the vehicle front-rear direction are provided at both right and left positions in a roof part of the vehicle body 10. A front end, a central part, and a rear end of each of the right and left roof side rails 20 are supported by the front pillar 30f, the center pillar 30c, and the rear pillar 30b, respectively.

A front roof reinforcement 40f, a center roof reinforcement 40c, and a rear roof reinforcement 40b, extending in a vehicle width direction, are provided between the right and left roof side rails 20 so as to be connected thereto. An area surrounded by the right and left roof side rails 20, the front roof reinforcement 40f, and the center roof reinforcement 40c serves as a roof opening 14 for a sun roof. Further, a roof panel 49 (not illustrated in FIGS. 1 to 4, see FIG. 5) is supported by the right and left roof side rails 20, the center roof reinforcement 40c, and the rear roof reinforcement 40b.

<Summary of Central Part Structure for Vehicle>

Figure 2:
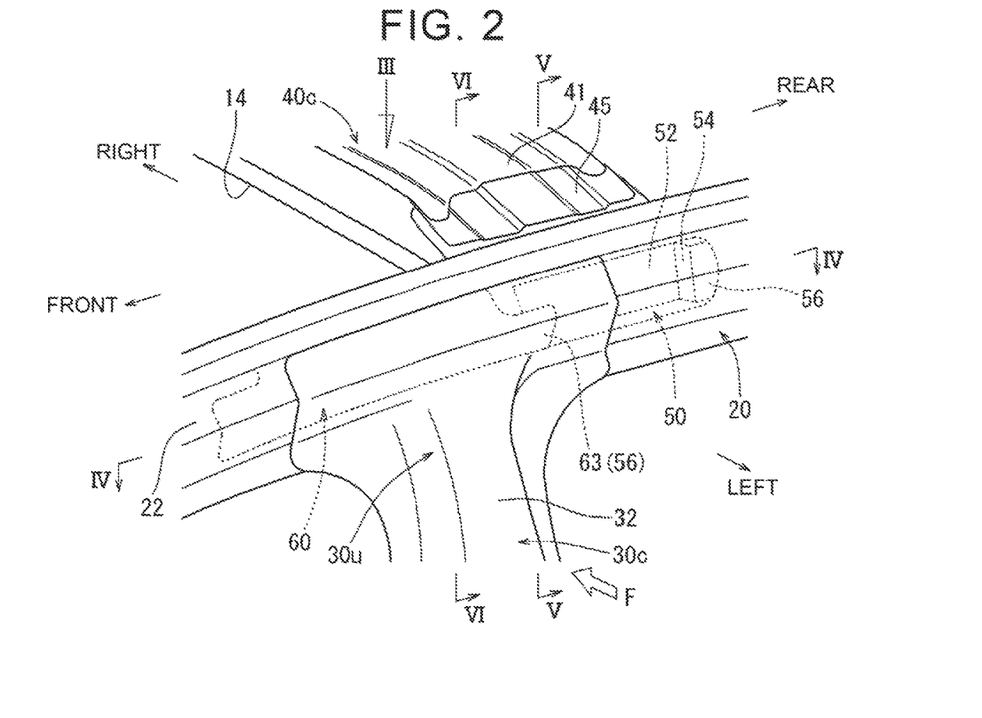
FIG. 2 is an enlarged view of a part indicated by an arrow II in FIG. 1.
Figure 3:
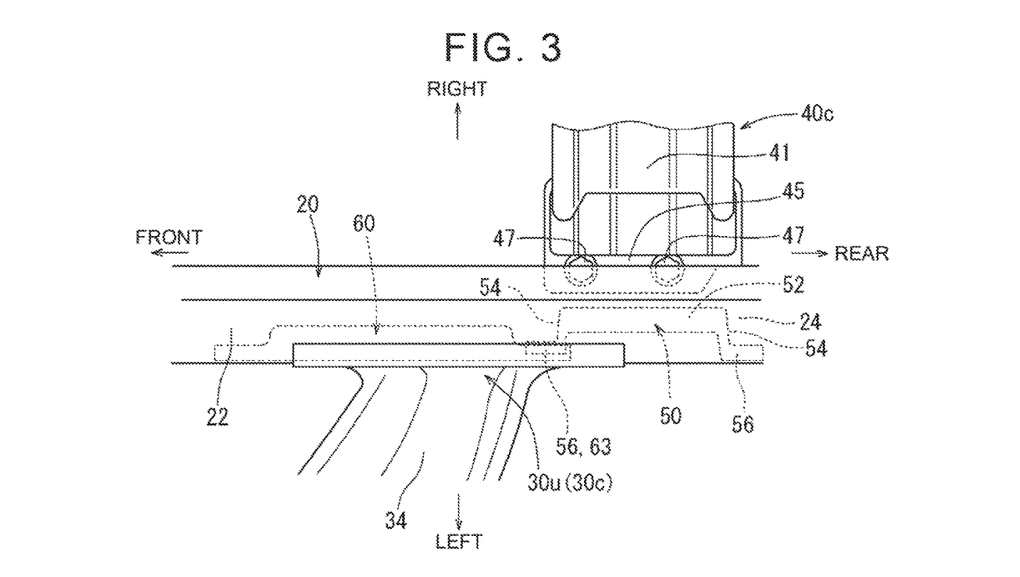
FIG. 3 is a plane view of a part indicated by an arrow III in FIG. 2.

As illustrated in FIGS. 1 to 3, an upper part of the center pillar 30c is connected to the roof side rail 20 at a position on a front side relative to the center roof reinforcement 40c. That is, as illustrated in FIG. 3, a position of the center pillar 30c and a position of the center roof reinforcement 40c are determined so that a rear part of the center pillar 30c and a front half part of the center roof reinforcement 40c are placed at the same position in the vehicle front-rear direction. The following describes respective structures of the roof side rail 20, the center roof reinforcement 40c, the upper part of the center pillar 30c, and the like, individually.

<Roof Side Rail 20>

Figure 5:
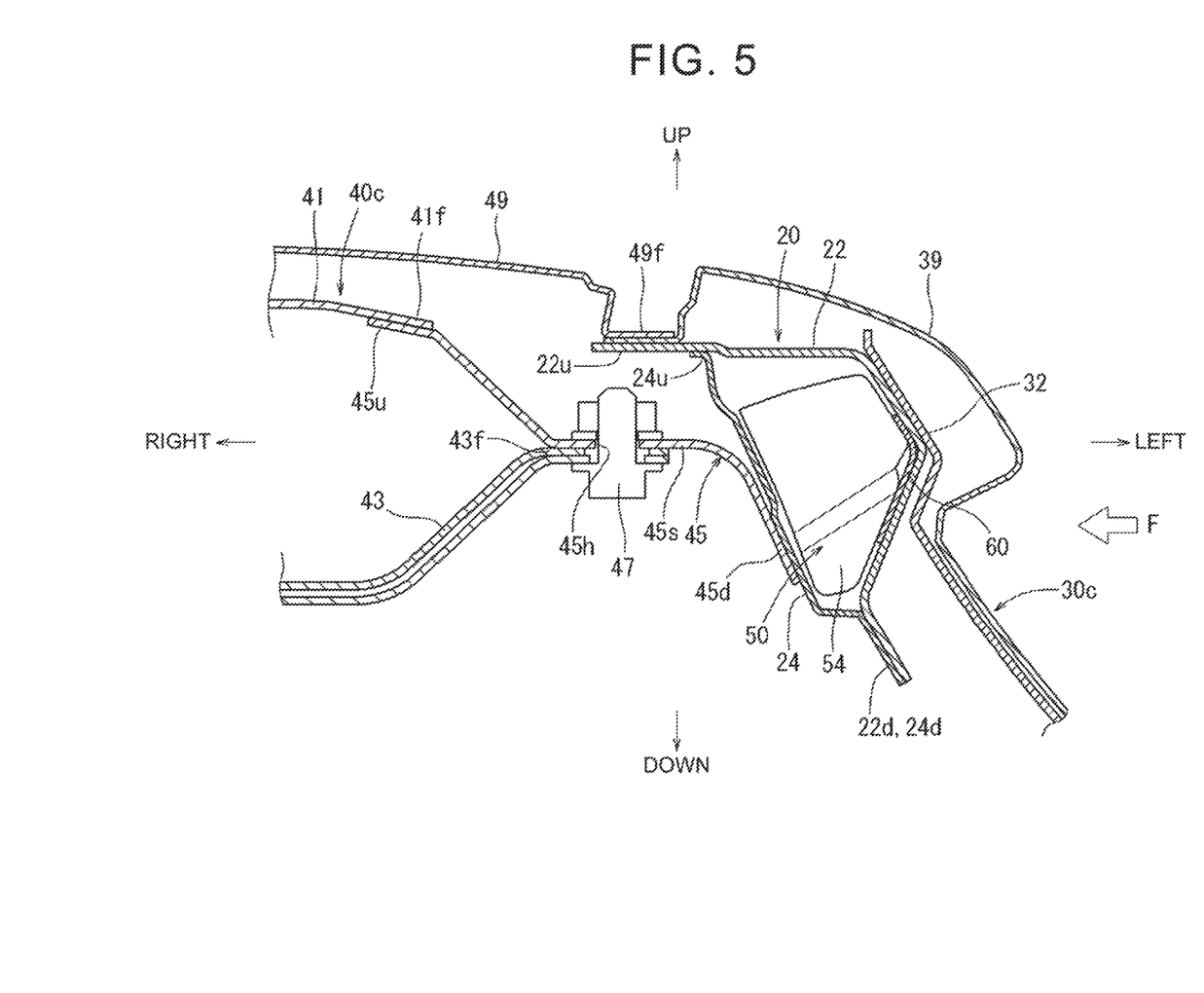
FIG. 5 is a drawing of a longitudinal section taken along an arrow V-V in FIG. 2.
Figure 6:
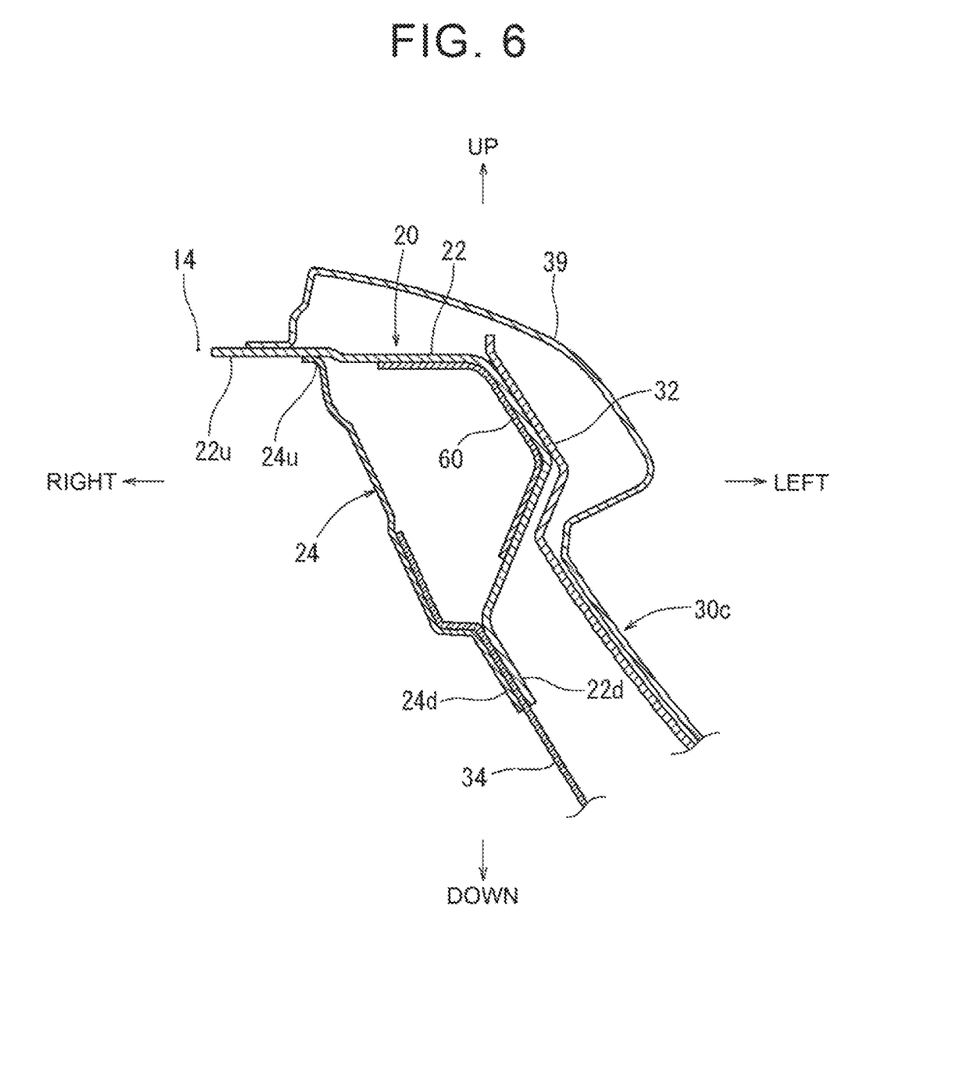
FIG. 6 is a drawing of a longitudinal section taken along an arrow VI-VI in FIG. 2.

As illustrated in FIGS. 5, 6, the roof side rail 20 includes a rail outer panel 22 having a section formed into a generally trapezoidal shape, and a rail inner panel 24 having a section formed into a generally flat Z-shape. An upper flange portion 24u of the rail inner panel 24 is joined to an upper flange portion 22u of the rail outer panel 22 from a lower side. Further, a lower flange portion 22d of the rail outer panel 22 and a lower flange portion 24d of the rail inner panel 24 are joined to each other in an overlapped manner. Hereby, the roof side rail 20 is formed in a tubular shape extending in the vehicle front-rear direction. Here, a plate thickness dimension of a steel sheet constituting the rail outer panel 22 is 1.8 mm, for example. Further, a plate thickness dimension of a steel sheet constituting the rail inner panel 24 is 1.0 mm, for example.

Figure 4:
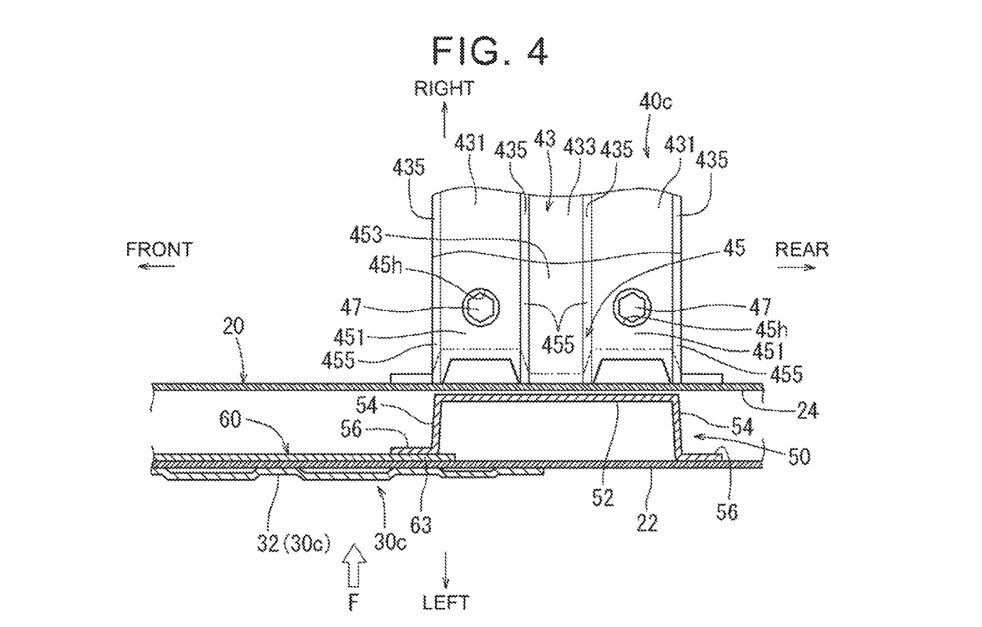
FIG. 4 is a sectional view taken along an arrow IV-IV in FIG. 2.

As illustrated in FIGS. 2 to 4, inside the roof side rail 20, a first reinforcing member 50 is provided at a position where the roof side rail 20 and the center roof reinforcement 40c overlap with each other. The first reinforcing member 50 includes a flat-shaped main reinforcement wall portion 52 placed along the rail inner panel 24 of the roof side rail 20. Further, a traverse portion 54 bent generally at a right angle to the main reinforcement wall portion 52 so as to cross a space inside the roof side rail 20 is provided in each end of the main reinforcement wall portion 52 in a longitudinal direction (a front-rear direction). Further, a tip end of the traverse portion 54 is bent generally at a right angle so as to provide a flange portion 56 along the rail outer panel 22 of the roof side rail 20. The flange portion 56 of the first reinforcing member 50 is fixed to the rail outer panel 22 by welding or the like. Here, a plate thickness dimension of a steel sheet constituting the first reinforcing member 50 is 1.2 mm, for example.

As illustrated in FIGS. 2 to 4 and FIG. 6, a second reinforcing member 60 is provided inside the roof side rail 20 at a position where the second reinforcing member 60 and an upper part 30u of the center pillar 30c overlap with each other. The second reinforcing member 60 is a panel placed along the rail outer panel 22 of the roof side rail 20 and formed in a flat-plate shape. As illustrated in FIG. 2 and so on, the second reinforcing member 60 is placed so that its rear end 63 and the front flange portion 56 of the first reinforcing member 50 overlap with each other. Here, a plate thickness dimension of a steel sheet constituting the second reinforcing member 60 is 1.2 mm, for example.

<Center Roof Reinforcement 40c>

As illustrated in FIG. 5, the center roof reinforcement 40c includes a roof support portion 41 having a band plate shape and provided on the upper side, a roof reinforcement body portion 43 having a band plate shape and provided on the lower side, and a mounting bracket 45. Both ends, in the vehicle width direction (right and left sides), of each of the roof support portion 41 and the roof reinforcement body portion 43 provided on the upper and lower sides are connected to respective roof side rails 20 (respective rail inner panels 24) via respective mounting bracket 45 having a band plate shape.

As illustrated in FIG. 5, the mounting bracket 45 is formed such that a band plate is shaped to have a generally stepped side surface. A flange portion 45u is formed in an upper end part (an inner side in the vehicle width direction) of the mounting bracket 45, and a flange portion 45d is formed in a lower end part (an outer side in the vehicle width direction) of the mounting bracket 45. Two bolt holes 45h arranged side by side in a width direction are formed in a horizontal portion 45s provided in a central part of the mounting bracket 45 in a height direction. Further, as illustrated in FIG. 4 and so on, the mounting bracket 45 is formed to have a corrugated section, and includes a pair of ridge portions 451 extending in the vehicle width direction (the right-left direction), and a groove portion 453 placed between those ridge portions 451. Vertical wall portions 455 are formed at a boundary position between the ridge portion 451 and the groove portion 453 of the mounting bracket 45 and on an outer side of the ridge portion 451 in its width direction. Here, a plate thickness dimension of a steel sheet constituting the mounting bracket 45 is 2.3 mm, for example.

As illustrated in FIG. 4, the mounting bracket 45 is configured such that the vertical wall portion 455 on a front end side and the vertical wall portion 455 on a rear end side are placed at the same positions, in the vehicle front-rear direction, as the front and rear traverse portions 54 of the first reinforcing member 50 of the roof side rail 20, respectively. As illustrated in FIG. 5, the mounting bracket 45 is configured such that, in the above state, the flange portion 45*d* provided on the lower side is fixed to the rail inner panel 24 of the roof side rail 20 by welding or the like. That is, the front and rear traverse portions 54 of the first reinforcing member 50 of the roof side rail 20 are placed at respective positions on respective extension lines of the front vertical wall portion 455 and the rear vertical wall portion 455 of the mounting bracket 45. As illustrated in FIG. 5, the horizontal portion 45*s* of the mounting bracket 45 and the flange portion 43*f* of the roof reinforcement body portion 43 are connected to each other via a bolt & nut mechanism 47.

As illustrated in FIG. 4, a width of the roof reinforcement body portion 43 is substantially equal to a width of the mounting bracket 45. Further, similarly to the mounting bracket 45, the roof reinforcement body portion 43 has a section formed in a corrugated shape, and includes a pair of ridge portions 431 extending in the vehicle width direction (the right-left direction), and a groove portion 433 placed between those ridge portions 431. Vertical wall portions 435 are formed at a boundary position between the ridge portion 431 and the groove portion 433 of the roof reinforcement body portion 43 and on an outer side of the ridge portion 431 in its width direction. Here, a dimension between the vertical wall portions 435 of the roof reinforcement body portion 43 is substantially equal to a dimension between the vertical wall portions 455 of the mounting bracket 45. Further, a plate thickness dimension of a steel sheet constituting the roof reinforcement body portion 43 is 2.3 mm, for example.

As illustrated in FIG. 5, the upper flange portion 45*u* of the mounting bracket 45 and the flange portion 41*f* of the roof support portion 41 having a band plate shape are joined to each other by welding or the like. The roof support portion 41 supports the roof panel 49 of the vehicle. Respective flange portions 49*f* are formed in both ends of the roof panel 49 in the vehicle width direction. As illustrated in FIG. 5, the flange portion 49*f* is joined to the upper flange portion 22*u* of the rail outer panel 22 of the roof side rail 20 by welding or the like. Note that a plate thickness dimension of a steel sheet constituting the roof support portion 41 is 1.0 mm, for example.

<Center Pillar 30*c*>

As illustrated in FIG. 6 and so on, the center pillar 30*c* is constituted by a pillar outer panel 32 and a pillar inner panel 34, and has a tubular shape. The pillar outer panel 32 is covered with a side member outer panel 39 constituting a design patent of the vehicle. Here, the side member outer panel 39 is not illustrated in FIGS. 1 to 4. As illustrated in FIG. 2, in the upper part 30*u* of the center pillar 30*c*, the pillar outer panel 32 is formed in a generally T-shape. A rear part of a part (hereinafter referred to as a generally T-shaped part) of the pillar outer panel 32, the part being formed in the generally T-shape, is placed so as to overlap with the front half part of the center roof reinforcement 40*c* in the vehicle front-rear direction (so as to be placed at the same position in the vehicle front-rear direction). The generally T-shaped part of the pillar outer panel 32 is connected to a side surface of the rail outer panel 22 of the roof side rail 20.

That is, as illustrated in FIGS. 2 to 4, the rear part of the generally T-shaped part of the pillar outer panel 32, the rail outer panel 22 of the roof side rail 20, the rear end 63 of the second reinforcing member 60, and the front flange portion 56 of the first reinforcing member 50 are provided in an overlapped manner and are joined by welding or the like. Further, a front part and a central part of the generally T-shaped part of the pillar outer panel 32, the rail outer panel 22 of the roof side rail 20, and the second reinforcing member 60 are provided in an overlapped manner and are joined by welding or the like. Further, as illustrated in FIG. 6, an upper part of the pillar inner panel 34 is sandwiched between the flange portions 22*d*, 24*d* of the rail outer panel 22 and the rail inner panel 24 of the roof side rail 20. Further, the upper part of the pillar inner panel 34 extends upward and is joined to the rail inner panel 24 by welding or the like.

<Operation of Central Part Structure for Vehicle according to Present Embodiment>

When the vehicle has a side collision, a collision load F is applied to the center pillar 30*c*. As illustrated in FIG. 2 and so on, the collision load F is applied to the roof side rail 20 via the generally T-shaped part (the upper part) of the center pillar 30*c* (the pillar outer panel 32). The collision load F applied to the roof side rail 20 via the pillar outer panel 32 is received by the second reinforcing member 60 and the traverse portions 54 of the first reinforcing member 50 in the roof side rail 20. Particularly, since the traverse portions 54 of the first reinforcing member 50 are provided so as to cross the space in the roof side rail 20, the traverse portions 54 can effectively receive the collision load F, so that the roof side rail 20 is hardly crushed.

As illustrated in FIG. 4, the first reinforcing member 50 is placed such that the rail inner panel 24 is sandwiched between the traverse portion 54 on the front end side and the vertical wall portion 455 of the mounting bracket 45 on the front end side. Further, the first reinforcing member 50 is placed such that the rail inner panel 24 is sandwiched between the traverse portion 54 on the rear end side and the vertical wall portion 455 of the mounting bracket on the rear end side. On this account, the collision load F applied to the traverse portions 54 (particularly, the front traverse portion 54) of the first reinforcing member 50 is transmitted to the roof reinforcement body portion 43 via the vertical wall portions 455 of the mounting bracket 45. That is, since the center pillar 30*c*, the roof side rail 20, and the center roof reinforcement 40*c* receive the collision load F effectively, it is possible to restrain the roof side rail 20 from deforming toward an inner side of the vehicle cabin.

<Advantage of Central Part Structure for Vehicle according to Present Embodiment>

In the central part structure for the vehicle of the present embodiment, the first reinforcing member 50 is accommodated in the roof side rail 20 at a position where the center roof reinforcement 40*c* and the roof side rail 20 overlap with each other. Further, the traverse portions 54 are placed at positions to receive the collision load F applied via the center pillar 30*c*. That is, since the traverse portions 54 receive the collision load F applied via the center pillar 30*c*, the roof side rail 20 is hardly crushed. On this account, the collision load F applied via the center pillar 30c is transmitted from the traverse portions 54 to the center roof reinforcement 40c extending in the right-left direction (the vehicle width direction). That is, since the center pillar 30c, the roof side rail 20, and the center roof reinforcement 40c receive the collision load F effectively, it is possible to restrain the roof side rail 20 from deforming toward the inner side of the vehicle cabin.

Further, the traverse portions 54 are placed on respective extension lines of the vertical wall portions 455, 435 of the center roof reinforcement 40c. Accordingly, transfer efficiency of the collision load F between the roof side rail 20 (the first reinforcing member 50) and the center roof reinforcement 40c improves. Further, since the flange portion 56 of the first reinforcing member 50 is joined to the generally T-shaped part of the center pillar 30c, transfer efficiency of the collision load F from the upper part of the center pillar 30c to the traverse portion 54 increases.

<Modification>

Here, the disclosure is not limited to the above embodiment, and various alterations can be made. For example, the present embodiment exemplifies an example in which a linear dimension of the first reinforcing member 50 in the vehicle front-rear direction is substantially equal to a width dimension of the center roof reinforcement 40c, and the front and rear traverse portions 54 of the first reinforcing member 50 are placed on respective extension lines of the vertical wall portions 455, 435 provided in a front end and a rear end of the center roof reinforcement 40c. However, the linear dimension of the first reinforcing member 50 can be made smaller than the width dimension of the center roof reinforcement 40c, so that the front and rear traverse portions 54 of the first reinforcing member 50 are placed on respective extension lines of the vertical wall portion 455, 435 provided in the front end and its subsequent vertical wall portion 455, 435 in the center roof reinforcement 40c. Further, the number of traverse portions 54 of the first reinforcing member 50 can be set in accordance with the number of vertical wall portions 455, 435 of the center roof reinforcement 40c.

Further, the present embodiment exemplifies an example in which the upper part of the center pillar 30c is connected to the roof side rail 20 on the front side relative to the center of the center roof reinforcement 40c. However, it is also possible to connect the upper part of the center pillar 30c to the roof side rail 20 at the same position as the center roof reinforcement 40c in the vehicle front-rear direction. Further, the present embodiment exemplifies an example in which the first reinforcing member 50 is formed in a gate shape, but the first reinforcing member 50 can be formed in a box shape, so that end surfaces of the box shape can be used as the traverse portions 54. Further, in the present embodiment, the traverse portions 54 of the first reinforcing member 50 are provided as separators that section the space in the roof side rail 20. However, the traverse portions 54 may have any other structures that can transmit the collision load F applied to the center pillar 30 to the center roof reinforcement 40c.

What is claimed is:

1. A central part structure for a vehicle, comprising:
   a roof side rail provided so as to extend in a vehicle front-rear direction, the roof side rail being formed in a tubular shape;
   a roof reinforcement extending in a vehicle width direction so as to be connected to the roof side rail and including at least one vertical wall portion extending in the vehicle width direction;
   a center pillar configured to support the roof side rail; and
   a first reinforcing member accommodated in the roof side rail at a position where the roof side rail and the roof reinforcement overlap with each other, wherein
   the first reinforcing member includes
      a main reinforcement wall portion extending along the roof side rail, and
      a traverse portion provided so as to cross the roof side rail, the traverse portion being placed at a position on an extension line of the vertical wall portion and where the traverse portion receives a side collision load applied via an upper part of the center pillar.

2. The central part structure for the vehicle, according to claim 1, wherein
   the traverse portion is provided on each end of the main reinforcement wall portion in the vehicle front-rear direction; and
   a linear dimension of the first reinforcing member in the vehicle front-rear direction is substantially equal to a width dimension of the roof reinforcement in the vehicle front-rear direction.

3. The central part structure for the vehicle, according to claim 1, wherein
   the first reinforcing member is connected to the upper part of the center pillar.

4. The central part structure for the vehicle, according to claim 1, wherein
   the upper part of the center pillar is connected to the roof side rail at a position on a front side relative to a center of the roof reinforcement in the vehicle front-rear direction.

5. The central part structure for the vehicle, according to claim 4, further comprising
   a roof opening formed in an area surrounded by the roof side rail and a front surface of the roof reinforcement.

6. The central part structure for the vehicle, according to claim 4, further comprising
   a second reinforcing member provided inside the roof side rail at a position where the upper part of the center pillar and the roof side rail overlap with each other, so as to reinforce the roof side rail, wherein
   a rear end of the second reinforcing member is connected to a front end of the first reinforcing member and the upper part of the center pillar.

7. The central part structure for the vehicle, according to claim 1, wherein
   the traverse portion is a separator configured to partition a space inside the roof side rail.

8. The central part structure for the vehicle, according to claim 1, wherein
   the roof reinforcement includes a plurality of vertical wall portions extending in the vehicle width direction.

* * * * *